United States Patent
Finkbeiner et al.

(10) Patent No.: US 11,556,339 B2
(45) Date of Patent: *Jan. 17, 2023

(54) VECTOR REGISTERS IMPLEMENTED IN MEMORY

(71) Applicant: Micron Technology, Inc., Boise, ID (US)

(72) Inventors: Timothy P. Finkbeiner, Boise, ID (US); Troy D. Larsen, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/454,171

(22) Filed: Nov. 9, 2021

(65) Prior Publication Data

US 2022/0066777 A1    Mar. 3, 2022

Related U.S. Application Data

(63) Continuation of application No. 16/156,808, filed on Oct. 10, 2018, now Pat. No. 11,175,915.

(51) Int. Cl.
*G06F 9/30* (2018.01)
*G06F 12/02* (2006.01)

(52) U.S. Cl.
CPC ...... *G06F 9/30036* (2013.01); *G06F 9/30101* (2013.01); *G06F 12/0246* (2013.01); *G06F 2212/2022* (2013.01)

(58) Field of Classification Search
CPC .. G06F 15/7821; G06F 3/0673; G06F 3/0659; G06F 9/30036; G06F 12/0246; G06F 9/30101; G06F 2212/2022
See application file for complete search history.

(56) References Cited

U.S. PATENT DOCUMENTS

| 4,380,046 | A | 4/1983 | Fung |
| 4,435,792 | A | 3/1984 | Bechtolsheim |
| 4,435,793 | A | 3/1984 | Ochii |

(Continued)

FOREIGN PATENT DOCUMENTS

| CN | 102141905 | 8/2011 |
| EP | 0214718 | 3/1987 |

(Continued)

OTHER PUBLICATIONS

Extended Search Report from related European Patent Application No. 19870190.6, dated Jun. 13, 2022, 11 pages.

(Continued)

*Primary Examiner* — Shawn Doman
(74) *Attorney, Agent, or Firm* — Brooks, Cameron & Huebsch, PLLC

(57) ABSTRACT

Systems and methods related to implementing vector registers in memory. A memory system for implementing vector registers in memory can include an array of memory cells, where a plurality of rows in the array serve as a plurality of vector registers as defined by an instruction set architecture. The memory system for implementing vector registers in memory can also include a processing resource configured to, responsive to receiving a command to perform a particular vector operation on a particular vector register, access a particular row of the array serving as the particular register to perform the vector operation.

20 Claims, 3 Drawing Sheets

(56) References Cited

U.S. PATENT DOCUMENTS

| | | |
|---|---|---|
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffmann et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,094,716 A | 7/2000 | Witt |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,178,482 B1 | 1/2001 | Sollars |
| 6,181,698 B1 | 1/2001 | Hariguchi |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,594,754 B1 | 7/2003 | Jourdan et al. |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth et al. |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mohklesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,873,272 B2 | 10/2014 | Lee |
| 8,964,496 B2 | 2/2015 | Manning |

(56) References Cited

U.S. PATENT DOCUMENTS

| | | |
|---|---|---|
| 8,971,124 B1 | 3/2015 | Manning |
| 9,015,390 B2 | 4/2015 | Klein |
| 9,047,193 B2 | 6/2015 | Lin et al. |
| 9,165,023 B2 | 10/2015 | Moskovich et al. |
| 9,659,605 B1 | 5/2017 | Zawodny et al. |
| 9,659,610 B1 | 5/2017 | Hush |
| 9,697,876 B1 | 7/2017 | Tiwari et al. |
| 9,761,300 B1 | 9/2017 | Willcock |
| 9,997,212 B1 | 6/2018 | Finkbeiner et al. |
| 10,068,664 B1 | 9/2018 | Penney et al. |
| 10,496,449 B1 | 12/2019 | Kolan et al. |
| 2001/0007112 A1 | 7/2001 | Porterfield |
| 2001/0008492 A1 | 7/2001 | Higashiho |
| 2001/0010057 A1 | 7/2001 | Yamada |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2003/0167426 A1 | 9/2003 | Slobodnik |
| 2003/0222879 A1 | 12/2003 | Lin et al. |
| 2004/0073592 A1 | 4/2004 | Kim et al. |
| 2004/0073773 A1 | 4/2004 | Demjanenko |
| 2004/0085840 A1 | 5/2004 | Vali et al. |
| 2004/0095826 A1 | 5/2004 | Perner |
| 2004/0103262 A1 | 5/2004 | Glossner et al. |
| 2004/0154002 A1 | 8/2004 | Ball et al. |
| 2004/0205289 A1 | 10/2004 | Srinivasan |
| 2004/0240251 A1 | 12/2004 | Nozawa et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2006/0047937 A1 | 3/2006 | Selvaggi et al. |
| 2006/0069849 A1 | 3/2006 | Rudelic |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0103986 A1 | 5/2007 | Chen |
| 2007/0171747 A1 | 7/2007 | Hunter et al. |
| 2007/0174598 A1 | 7/2007 | Thekkath et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0285131 A1 | 12/2007 | Sohn |
| 2007/0285979 A1 | 12/2007 | Turner |
| 2007/0291532 A1 | 12/2007 | Tsuji |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0137388 A1 | 6/2008 | Krishnan et al. |
| 2008/0165601 A1 | 7/2008 | Matick et al. |
| 2008/0178053 A1 | 7/2008 | Gorman et al. |
| 2008/0215937 A1 | 9/2008 | Dreibelbis et al. |
| 2009/0067218 A1 | 3/2009 | Graber |
| 2009/0154238 A1 | 6/2009 | Lee |
| 2009/0154273 A1 | 6/2009 | Borot et al. |
| 2009/0254697 A1 | 10/2009 | Akerib |
| 2010/0067296 A1 | 3/2010 | Li |
| 2010/0091582 A1 | 4/2010 | Vali et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0318764 A1 | 12/2010 | Greyzck et al. |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0219260 A1 | 9/2011 | Nobunaga et al. |
| 2011/0267883 A1 | 11/2011 | Lee et al. |
| 2011/0317496 A1 | 12/2011 | Bunce et al. |
| 2012/0005397 A1 | 1/2012 | Lim et al. |
| 2012/0005459 A1 | 1/2012 | Fleischman et al. |
| 2012/0017039 A1 | 1/2012 | Margetts |
| 2012/0023281 A1 | 1/2012 | Kawasaki et al. |
| 2012/0120705 A1 | 5/2012 | Mitsubori et al. |
| 2012/0134216 A1 | 5/2012 | Singh |
| 2012/0134225 A1 | 5/2012 | Chow |
| 2012/0134226 A1 | 5/2012 | Chow |
| 2012/0140540 A1 | 6/2012 | Agam et al. |
| 2012/0182798 A1 | 7/2012 | Hosono et al. |
| 2012/0195146 A1 | 8/2012 | Jun et al. |
| 2012/0198310 A1 | 8/2012 | Tran et al. |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2013/0003467 A1 | 1/2013 | Klein |
| 2013/0024647 A1 | 1/2013 | Gove |
| 2013/0061006 A1 | 3/2013 | Hein |
| 2013/0107623 A1 | 5/2013 | Kavalipurapu et al. |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2014/0047214 A1 | 2/2014 | Fleischer et al. |
| 2014/0185395 A1 | 7/2014 | Seo |
| 2014/0215185 A1 | 7/2014 | Danielsen |
| 2014/0250279 A1 | 9/2014 | Manning |
| 2014/0344934 A1 | 11/2014 | Jorgensen |
| 2015/0029798 A1 | 1/2015 | Manning |
| 2015/0042380 A1 | 2/2015 | Manning |
| 2015/0063052 A1 | 3/2015 | Manning |
| 2015/0078108 A1 | 3/2015 | Cowles et al. |
| 2015/0120987 A1 | 4/2015 | Wheeler |
| 2015/0134713 A1 | 5/2015 | Wheeler |
| 2015/0268875 A1 | 9/2015 | Jeddeloh et al. |
| 2015/0270015 A1 | 9/2015 | Murphy et al. |
| 2015/0279466 A1 | 10/2015 | Manning |
| 2015/0324290 A1 | 11/2015 | Leidel |
| 2015/0325272 A1 | 11/2015 | Murphy |
| 2015/0356009 A1 | 12/2015 | Wheeler et al. |
| 2015/0356022 A1 | 12/2015 | Leidel et al. |
| 2015/0357007 A1 | 12/2015 | Manning et al. |
| 2015/0357008 A1 | 12/2015 | Manning et al. |
| 2015/0357019 A1 | 12/2015 | Wheeler et al. |
| 2015/0357020 A1 | 12/2015 | Manning |
| 2015/0357021 A1 | 12/2015 | Hush |
| 2015/0357022 A1 | 12/2015 | Hush |
| 2015/0357023 A1 | 12/2015 | Hush |
| 2015/0357024 A1 | 12/2015 | Hush et al. |
| 2015/0357047 A1 | 12/2015 | Tiwari |
| 2016/0062672 A1 | 3/2016 | Wheeler |
| 2016/0062673 A1 | 3/2016 | Tiwari |
| 2016/0062692 A1 | 3/2016 | Finkbeiner et al. |
| 2016/0062733 A1 | 3/2016 | Tiwari |
| 2016/0063284 A1 | 3/2016 | Tiwari |
| 2016/0064045 A1 | 3/2016 | La Fratta |
| 2016/0064047 A1 | 3/2016 | Tiwari |
| 2016/0098208 A1 | 4/2016 | Willcock |
| 2016/0098209 A1 | 4/2016 | Leidel et al. |
| 2016/0110135 A1 | 4/2016 | Wheeler et al. |
| 2016/0125919 A1 | 5/2016 | Hush |
| 2016/0154596 A1 | 6/2016 | Willcock et al. |
| 2016/0155482 A1 | 6/2016 | La Fratta |
| 2016/0179526 A1 | 6/2016 | Jha et al. |
| 2016/0188250 A1 | 6/2016 | Wheeler |
| 2016/0196142 A1 | 7/2016 | Wheeler et al. |
| 2016/0196856 A1 | 7/2016 | Tiwari et al. |
| 2016/0224513 A1 | 8/2016 | Moudgill |

(56) References Cited

U.S. PATENT DOCUMENTS

| | | |
|---|---|---|
| 2016/0225422 A1 | 8/2016 | Tiwari et al. |
| 2016/0266873 A1 | 9/2016 | Tiwari et al. |
| 2016/0266899 A1 | 9/2016 | Tiwari |
| 2016/0267951 A1 | 9/2016 | Tiwari |
| 2016/0292080 A1 | 10/2016 | Leidel et al. |
| 2016/0306584 A1 | 10/2016 | Zawodny et al. |
| 2016/0306614 A1 | 10/2016 | Leidel et al. |
| 2016/0350230 A1 | 12/2016 | Murphy |
| 2016/0365129 A1 | 12/2016 | Willcock |
| 2016/0371033 A1 | 12/2016 | La Fratta et al. |
| 2017/0031865 A1 | 2/2017 | Eyole et al. |
| 2017/0052906 A1 | 2/2017 | Lea |
| 2017/0177340 A1 | 6/2017 | Jha et al. |
| 2017/0178701 A1 | 6/2017 | Willcock et al. |
| 2017/0192844 A1 | 7/2017 | Lea et al. |
| 2017/0228192 A1 | 8/2017 | Willcock et al. |
| 2017/0235515 A1 | 8/2017 | Lea et al. |
| 2017/0236564 A1 | 8/2017 | Zawodny et al. |
| 2017/0242902 A1 | 8/2017 | Crawford et al. |
| 2017/0243623 A1 | 8/2017 | Kirsch et al. |
| 2017/0262369 A1 | 9/2017 | Murphy |
| 2017/0263306 A1 | 9/2017 | Murphy |
| 2017/0269865 A1 | 9/2017 | Willcock et al. |
| 2017/0269903 A1 | 9/2017 | Tiwari |
| 2017/0277433 A1 | 9/2017 | Willcock |
| 2017/0277440 A1 | 9/2017 | Willcock |
| 2017/0277581 A1 | 9/2017 | Lea et al. |
| 2017/0277637 A1 | 9/2017 | Willcock et al. |
| 2017/0278559 A1 | 9/2017 | Hush |
| 2017/0278584 A1 | 9/2017 | Rosti |
| 2017/0285988 A1 | 10/2017 | Dobelstein |
| 2017/0293434 A1 | 10/2017 | Tiwari |
| 2017/0301379 A1 | 10/2017 | Hush |
| 2017/0309314 A1 | 10/2017 | Zawodny et al. |
| 2017/0329577 A1 | 11/2017 | Tiwari |
| 2017/0336989 A1 | 11/2017 | Zawodny et al. |
| 2017/0337126 A1 | 11/2017 | Zawodny et al. |
| 2017/0337953 A1 | 11/2017 | Zawodny et al. |
| 2017/0352391 A1 | 12/2017 | Hush |
| 2017/0371539 A1 | 12/2017 | Mai et al. |
| 2018/0012636 A1 | 1/2018 | Alzheimer et al. |
| 2018/0024769 A1 | 1/2018 | Howe et al. |
| 2018/0024919 A1 | 1/2018 | Glossner et al. |
| 2018/0024926 A1 | 1/2018 | Penney et al. |
| 2018/0025759 A1 | 1/2018 | Penney et al. |
| 2018/0025768 A1 | 1/2018 | Hush |
| 2018/0032458 A1 | 2/2018 | Bell |
| 2018/0033478 A1 | 2/2018 | Lea et al. |
| 2018/0039484 A1 | 2/2018 | La Fratta et al. |
| 2018/0046405 A1 | 2/2018 | Hush et al. |
| 2018/0046461 A1 | 2/2018 | Tiwari |
| 2018/0060069 A1 | 3/2018 | Rosti et al. |
| 2018/0074754 A1 | 3/2018 | Crawford |
| 2018/0075899 A1 | 3/2018 | Hush |
| 2018/0088850 A1 | 3/2018 | Willcock |
| 2018/0102147 A1 | 4/2018 | Willcock et al. |
| 2018/0108397 A1 | 4/2018 | Venkata et al. |
| 2018/0130515 A1 | 5/2018 | Zawodny et al. |
| 2018/0136871 A1 | 5/2018 | Leidel |
| 2018/0239531 A1 | 8/2018 | Lea |
| 2018/0239712 A1 | 8/2018 | Lea |
| 2018/0240510 A1 | 8/2018 | Hush et al. |
| 2018/0300128 A1 | 10/2018 | Kim et al. |
| 2019/0235780 A1 | 8/2019 | DeBenedictis |
| 2019/0317892 A1 | 10/2019 | Lee |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1999 |
| KR | 10-2010-0134235 | 12/2010 |
| KR | 10-2013-0049421 | 5/2013 |
| WO | 2001065359 | 9/2001 |
| WO | 2010079451 | 7/2010 |
| WO | 2013062596 | 5/2013 |
| WO | 2013081588 | 6/2013 |
| WO | 2013095592 | 6/2013 |

OTHER PUBLICATIONS

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

Stojmenovic, "Multiplicative Circulant Networks Topological Properties and Communication Algorithms", (25 pgs.), Discrete Applied Mathematics 77 (1997) 281-305.

Boyd et al., "On the General Applicability of Instruction-Set Randomization", Jul.-Sep. 2010, (14 pgs.), vol. 7, Issue 3, IEEE Transactions on Dependable and Secure Computing.

Elliot, et al., "Computational RAM: Implementing Processors in Memory", Jan.-Mar. 1999, (10 pgs.), vol. 16, Issue 1, IEEE Design and Test of Computers Magazine.

Power ISA Version 3.0 Datasheet [online]. IBM, 2017 [retrieved on Feb. 11, 2021]. Retrieved from the Internet: <URL: https://ibm.ent.box.com/s/1hzcwkwf8rbju5h9iyf44wm94amnlcrv>.

International Search Report and Written Opinion for related PCT Application No. PCT/US2019/055487, dated Oct. 10, 2019, 11 pages.

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.

Kogge, et al., "Processing In Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-In-Memory Chip," Jun. 22-26, 2002, (12 pgs.), ICS '02, retrieved from: http://www.isi.edu/~draper/papers/ics02.pdf.

Adibi, et al., "Processing-In-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

International Search Report and Written Opinion for PCT Application No. PCT/US2013/043702, dated Sep. 26, 2013, (11 pgs.).

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

Pagiamtzis, Kostas, "Content-Addressable Memory Introduction", Jun. 25, 2007, (6 pgs.), retrieved from: http://www.pagiamtzis.com/cam/camintro.

Debnath, Biplob, Bloomflash: Bloom Filter on Flash-Based Storage, 2011 31st Annual Conference on Distributed Computing Systems, Jun. 20-24, 2011, 10 pgs.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

VECTOR REGISTERS IMPLEMENTED IN MEMORY

PRIORITY INFORMATION

This application is a Continuation of U.S. application Ser. No. 16/156,808, filed Oct. 10, 2018, which will issue as U.S. Pat. No. 11,175,915 on Nov. 16, 2021, the contents of which are included herein by reference.

TECHNICAL FIELD

The present disclosure relates generally to memory, and more particularly, to apparatuses and methods associated with vector registers implemented in memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instructions (e.g., a program, applications, etc.). The number of processing resources can access data stored in the memory.

DETAILED DESCRIPTION

Figure 1:
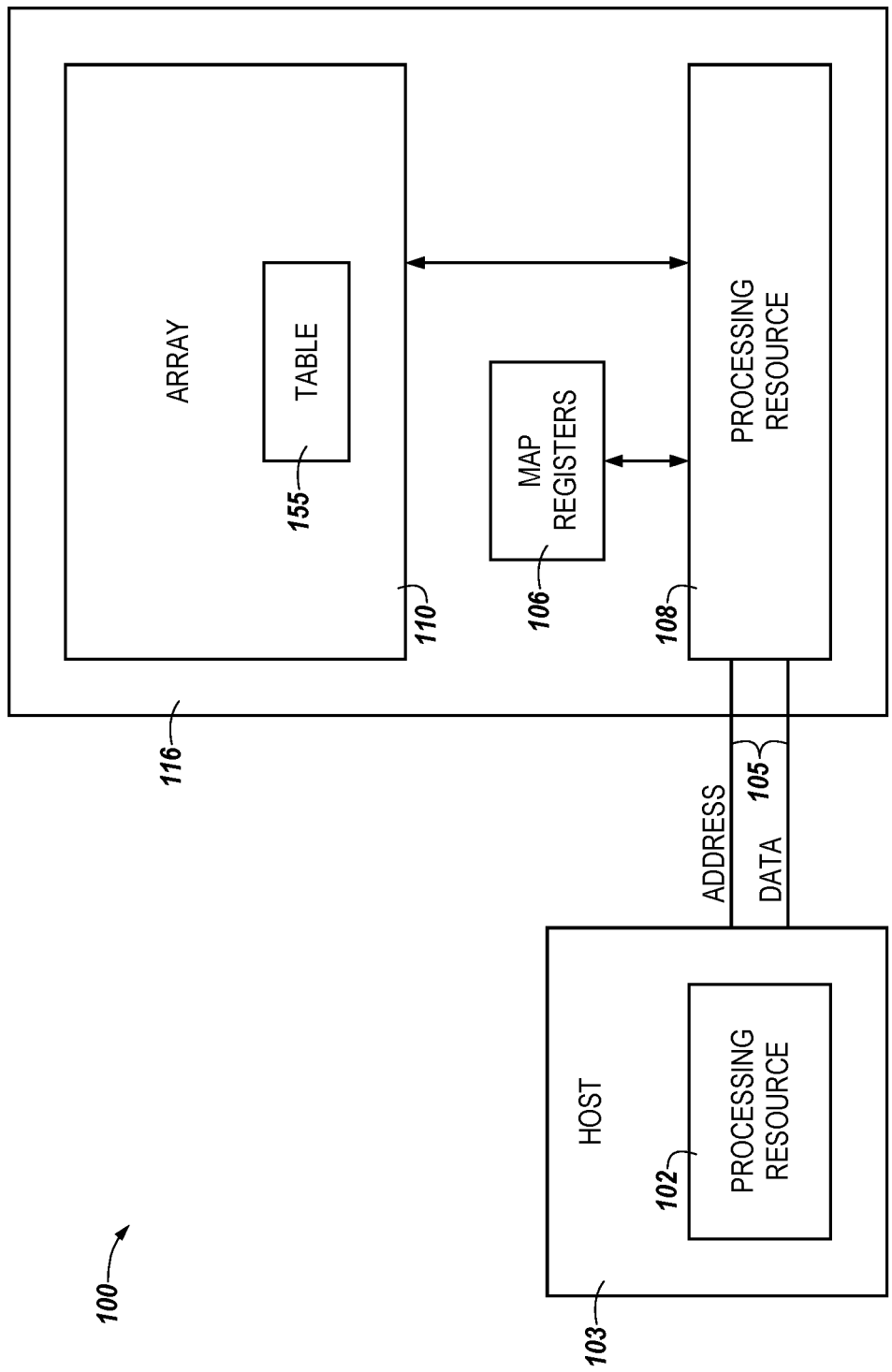
FIG. 1 is a block diagram of a computing system including a memory system and capable of mapping registers implemented in an array of memory cells in accordance with a number of embodiments of the present disclosure.

The present disclosure includes apparatuses and methods related to mapping registers implemented in an array of memory cells. An example system can include an array of memory cells, where a plurality of rows in the array serve as a plurality of vector registers as defined by an instruction set architecture. The example system can also include a processing resource configured to, responsive to receiving a command to perform a particular vector operation on a particular vector register, access a particular row of the array serving as the particular register to perform the vector operation.

Computing systems can include registers which correspond to a host and/or a processing resource such as a central processing unit (CPU). Registers store data to fulfil requests for the data in a smaller duration of time than if the data is retrieved from memory. For example, a processing resource may access data stored in registers local to the processing resource in a smaller duration of time than a time used to access data from memory. Accessing data from a memory device may include transferring the data through a bus which may increase the duration used to retrieve the data as compared to retrieving the data from registers, where the bus couples a processing resource accessing the data to the memory device. Data may be retrieve faster from registers than from memory resources such as a dynamic random-access memory (DRAM) array. As such, it may be beneficial to implement registers local to processing resources.

Implementing registers local to a processing resource can include moving data from the memory array to the registers. Moving data from the memory array to the registers can take longer than utilizing the array itself as registers. Implementing registers local to the processing resource can also increase the cost of manufacturing the processing resource.

In a number of examples, rows of an array can serve as respective registers, which can provide benefits such as reducing the cost of manufacturing registers external from the array and/or can improve system operation by reducing the time associated with moving data between the array and external registers. For example, particular rows of memory cells in an array of a memory device can be utilized as respective vector registers. Each row can be mapped to a specific vector register. The mapping can be performed with or without map registers.

Vector registers can be utilized by a processing resource local to the memory device or a processing resource external to the memory device to access data. The processing resource local to the memory device can be a processing in memory (PIM) processing resource, a bank controller, and/or an application processor, for example.

In the examples described herein, the processing resource external to the memory resource and the processing resource local to the memory resource can share a same instruction set. For example, the external processing resource and the internal processing resource can share an instruction set architecture (ISA). Sharing an ISA provides the external processing resource the ability to provide instructions to the internal processing resource that the external processing resource could itself execute. Implementing vector registers in an array using the map registers facilitates the use of a shared instruction set given that references to the registers can be executed by both the external processing resource and/or the internal processing resource using a limited set of map registers without having the added cost of implementing registers in the memory system.

In some examples, the vector registers can be implemented without the use of map registers. The mapping between vector registers and row of the array can be hard coded into the memory device. Hard coded mappings can map vector registers to rows without providing the ability to reassign vector registers to different rows.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of a computing system 100 including a memory system 116 and capable of mapping registers implemented in an array of memory cells in accordance with a number of embodiments of the present disclosure. The computing system 100 includes a host 103 and the memory system 116. The host 103 includes a processing resource 102 among other possible devices such as registers (not shown). The memory system 116 includes map registers 106, a processing resource 108, and a memory array 110, among other possible devices.

As used herein, an "apparatus" can refer to, but is not limited to, a variety of structures or combinations of structures, such as a circuit or circuitry, a die or one or more die, a device or devices, or a system or systems. For example, system 100, the processing resource 102, the map registers 106, the processing resource 108, the memory array 110, and/or the memory system 116 may separately be referred to as an "apparatus."

The memory system 116 includes a number of memory devices, one of which is shown. The memory devices can comprise a number of physical memory "chips," or die which can each include a number of arrays (e.g., banks) of memory cells and corresponding support circuitry (e.g., address circuitry, I/O circuitry, control circuitry, read/write circuitry, etc.) associated with accessing the array(s) (e.g., to read data from the arrays and write data to the arrays). As an example, the memory devices can include a number of DRAM devices, SRAM devices, PCRAM devices, RRAM devices, FeRAM, phase-change memory, 3DXP, and/or Flash memory devices. The memory device can also comprise a single physical memory "chip" or die which can include a number of arrays (e.g., banks) of memory cells and corresponding support circuitry (e.g., address circuitry, I/I circuitry, control circuitry, read/write circuitry, etc.) associated with accessing the array(s) (e.g., to read data from the arrays and write data to the arrays). In a number of embodiments, the memory system 116 can serve as main memory for the computing system.

In this example, the computing system 100 includes the host 103 coupled to the memory system 116 via a bus 105. The computing system 100 can be a laptop computer, personal computers, digital camera, digital recording and playback device, mobile telephone, PDA, memory card reader, interface hub, sensor, Internet-of-Things (IoT) enabled device, among other systems, and the processing resource 102 can be a number of processing resources (e.g., one or more processors) capable of accessing the array via the processing resource 108. The host 103 may be responsible for execution of an operating system (OS) and/or various applications that can be loaded thereto (e.g., from the memory system 116 and/or the processing resource 108).

The processing resource 108 can also include a state machine, a sequencer, and/or some other type of control circuitry, which may be implemented in the form of an application specific integrated circuit (ASIC) coupled to a printed circuit board. The processing resource 108 can be a controller such as a bank controller. A bank controller can, in some examples, perform vector operations on data stored in the array 110 using the map registers 106. The vector operations can be received from the host 103 and/or can be retrieved from the array 110. The bank controller can perform multiple types of operations including vector operations, read operations, and write operations, among other types of operations.

In some instances, the host 103 and/or the processing resource 108 can be an application processor. The application processor can be on a same memory die as the memory system 116.

Figure 2:
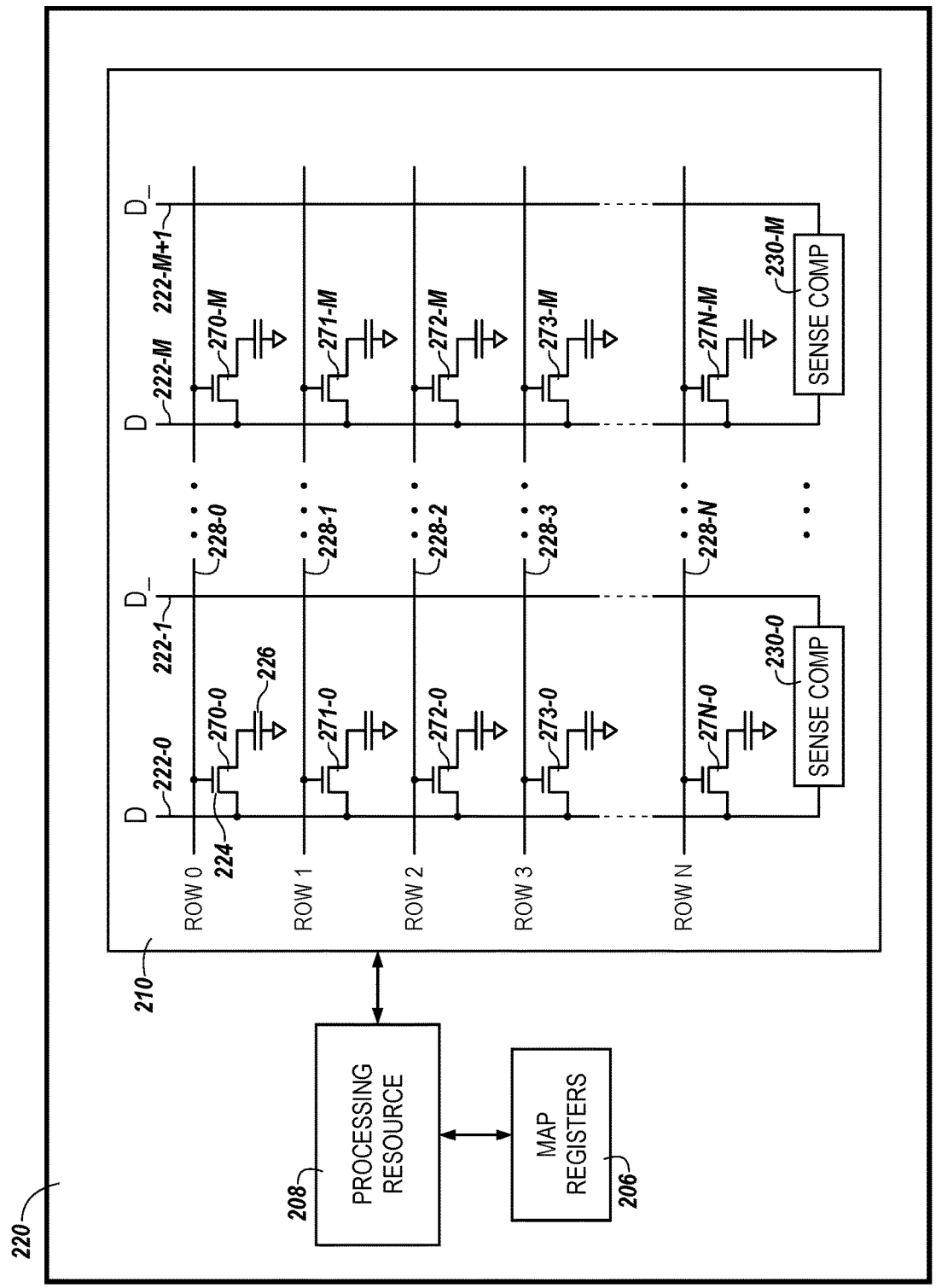
FIG. 2 is a block diagram of a memory bank capable of mapping registers implemented in an array of memory cells in accordance with a number of embodiments of the present disclosure.

In some examples, the memory device 116 can be a PIM device capable of performing processing. The PIM device can perform processing in addition to or instead of the processing performed by the processing resource 102. For example, the memory device 116 can include a processing resource in the sensing circuitry of the array 110 as shown in FIG. 2. The PIM device can perform processing functions without moving data out of the array 110 and/or the sensing circuitry.

As used herein, vector operations include operations performed using a plurality of values. For example, a vector addition operation can perform multiple addition operations concurrently using multiple data values. For instance, a vector addition operation can include a first addition operation and a second addition operation. The first addition operation can be performed using a first data value and a second data value while the second addition operation can be performed using a third data value and a fourth data value. Vector operations are not to be limited to addition operations and/or subtraction operations but can include logical operations including addition operations, subtraction operations, multiplication operations, division operations, and/or inversion operations, among other types of logical operations. The logical operations can also include bitwise operations including conjunction operations (e.g., AND operations) and/or disjunction operations (e.g., OR operations), among other bitwise operations.

As used herein, a value (e.g., data value) can include a grouping of one or more bits. Multiple values can be combined into a vector. For example, a vector of data can include 513 values where each of the 513 values is defined utilizing 32 bits. In some examples, the vector of values can be the grouping of multiple values into a single vector.

The read and write operations can be used to manipulate data stored in the array 110. For example, a read operation can transfer data from the array 110 to the processing resources 102 and/or 108. A write operation can store data received by the processing resources 102 and/or 108, where the data is stored in the array 110.

The processing resource 108 can perform logical operations and/or vector operations utilizing the data stored in the memory array 110 in vector registers. For instance, the processing resource 102 can provide instructions to the processing resource 108 through the bus 105. The instructions can identify a logical operation to perform by referencing one or more vector registers that store vector data. A vector register can comprise a plurality of memory cells of the array 110.

The map registers 106 can map memory cells to identifications (IDs) of the vector registers such that references to the vector register can be resolved to memory cells of the array 110. In some examples, the logical operation can reference vector registers which store the data. For example, the logical operation can be an addition operation which references a first vector register and a second vector register using a first register identifier and a second register identifier. References to the registers can be resolved utilizing the map registers 106m, the first register identifier, and/or the second register identifier. For example, the first register can be associated with the first map register through the first register identifier and the second register can be associated with the second map register through the second register identifier.

The first map register can store a first memory address of the array 110 which identifies a first row of memory cells that store a first vector value. A row of memory cells can include a plurality of memory cells commonly coupled to an access line of the memory array 110. The second map register can store a second memory address of the array 110 which identifies a second row of memory cells that store a second vector value.

The processing resource 108 can retrieve the first value and the second value utilizing the first memory address and the second memory address retrieved from the map registers 106. The processing resource 108 can utilize the first value and the second value to perform the addition operation.

In some examples, the processing resource 102 can provide vector data to be stored in vector registers of the memory system 116. The vector data can be transferred between the host 103 and the memory system 116 over interfaces which can comprise physical interfaces such as buses (e.g., bus 105), for example, employing a suitable protocol. Such protocol may be custom or proprietary. The bus 105 may employ a standardized protocol, such as Peripheral Component Interconnect Express (PCIe), Gen-Z, CCIX, or the like. As an example, the bus 105 may comprise combined address, command, and data buses or separate buses for respective address, command, and data signals.

The map registers 106 can store a number of bits which are fewer in quantity than the bits stored in the registers corresponding to the processing resource 102. The map registers 106 can store memory addresses corresponding to the array 110. In some examples, the memory addresses stored in the map registers 106 can identify a single memory cell or multiple memory cells. For instance, the map registers 106 can utilize 16 bits to store a memory address. Although, the map registers 106 can utilize more or fewer bits to store memory addresses.

The map registers 106 can be associated with a vector register ID. For example, a first map register can store a memory address and can be associated with a vector register ID. The map registers 106 can map vector register ID, and by extension vector registers, to memory cells of the array 110. The mapping of vector registers to the memory cells provides access to the memory cells as vector registers without the added expense of implementing the memory cells and the vector registers separately.

In some examples, the map registers 106 can comprise a single map register or multiple map registers. In instances utilizing a single map register, the map register can store an address of memory cells that store vector data. The processing resource 108 can extract a first memory address from a map register. The processing resource 108 can extract vector data from a first group of memory cells having the first memory address. The processing resource 108 can then execute the vector operations utilizing the vector data.

The processing resource 108 can be configured to perform logical operations and/or vector operations. The processing resource can be configured to perform vector operations, for example, utilizing an extension to core capabilities implemented by the processing resource 108.

FIG. 2 is a block diagram of a memory bank 220 capable of mapping registers implemented in an array of memory cells in accordance with a number of embodiments of the present disclosure. The memory bank 220 includes a processing resource 208, mapping registers 206, and a memory array 210. The map registers 206, the processing resource 208, and the memory array 210 are analogous to the map registers 106, the processing resource 108, and the memory array 110 in FIG. 1.

In this example, the memory array 210 is a DRAM array of 1T1C (one transistor one capacitor) memory cells 270-0, . . . , 270-M, 271-0, . . . , 271-M, 272-0, . . . , 272-M, 273-0, . . . , 273-M, . . . , 27N-0, 27N-M (e.g., referred to as memory cells 270), each comprised of an access device 224 (e.g., transistor) and a storage element 226 (e.g., a capacitor).

In a number of embodiments, the memory cells 270 are destructive read memory cells (e.g., reading the data stored in the cells destroys the data such that the data originally stored in the cells is refreshed after being read). The memory cells 270 can also be non-destructive read memory cells (e.g., reading the data stored in the cells does not destroy the data). As such, the memory cells 270 can be volatile or non-volatile memory cells.

The memory cells 270 are arranged in rows coupled by access lines 228-0 (Row0), 228-1 (Row1), 228-2 (Row2), 228-3 (Row3), . . . , 228-N (RowN) (e.g., referred to collectively as access lines 228) and columns coupled by sense lines (e.g., digit lines) 222-0 (D), 222-1 (D_), 222-M (D), 222-M+1 (D_) (e.g., referred to collectively as sense lines 222). In a number of embodiments, the array 210 can include address spaces that are coupled to separate circuitry.

The access lines may be referred to herein as word lines or select lines. The sense lines may be referred to herein as digit lines or data lines.

In this example, each column of cells is associated with a pair of complementary sense lines such as complementary sense lines 222-0 (D) and 222-1 (D_). The structure illustrated in FIG. 2 may be used to provide many complimentary sense lines 222, access lines 228 and/or memory cells 270. Although only four columns of memory cells 270 are illustrated in FIG. 2, embodiments are not so limited. For instance, a particular array may have a number of columns of cells and/or sense lines (e.g., 4,096, 8,192, 16,384, etc.). In FIG. 2, memory cells 270-0 to 27N-0 are coupled to sense line 222-0. Although the memory cell 27N-0 shows the variable N in the ones place, it is to be understood that the memory cell 27N-0 can be any number greater than 270-0. A gate of a particular cell transistor 224 is coupled to its corresponding access line from the access lines 228-0 to 228-N (e.g., referred to collectively as access lines 228), a first source/drain region is coupled to its corresponding sense line 222-0, and a second source/drain region of a particular cell transistor is coupled to its corresponding capacitor (e.g., capacitor 226). Although not illustrated in FIG. 2, the sense lines 222-1 and 222-M+1, may also have memory cells coupled thereto.

In a number of examples, memory cells 270 that are coupled to sense line 222-0 can store bits. The bits can represent a logical representation of a value and/or a number of values. For example, a first value can be represented by a three bit-vector that can be stored in memory cell 270-0, memory cell 270-1, and memory cell 270-2 along access line 228-0. In a number of examples, a bit-vector can be represented by more or fewer bits than those discussed in FIG. 2. Other examples bit-vectors can be represented by a 4-bit vector, an 8 bit-vector, a 16 bit-vector, and/or a 32 bit-vector, among other bit-vector dimensions. In a number of examples, each bit-vector representation of a value can be stored horizontally along access lines 228 as opposed to vertically along sense lines 222.

In some instances, the memory cells coupled to an access line 228-0 and to a number of sense lines (e.g., sense line 222-0 to sense line 222-M+1) can be activated in parallel. Furthermore, memory cell 270-0, memory cell 270-1, memory cell 270-2, memory cell 270-3 can also be activated in parallel. In a number of examples, independently addressed access lines 228 and/or sense lines 222 can be activated in parallel to activate a number of memory cells in parallel.

The memory array 210 can also comprise sensing components 230-1 to 230-M, which may be referred to generally as sensing components 230. The sensing components 230 can also be referred to as sensing circuitry. FIG. 2 also shows the sensing components 230 coupled to the memory array 210. The sensing component 230-0 is coupled to the complementary sense lines D, D_corresponding to a particular column of memory cells and the sensing component 230-M is coupled to complementary sense lines. The sensing component 230 can be operated to determine a state (e.g., logic data value) stored in a selected cell (e.g., memory cells 270). Embodiments are not limited to a given sensing amplifier architecture or type. For instance, sensing circuitry, in accordance with a number of embodiments described herein, can include current-mode sense amplifiers and/or single-ended sense amplifiers (e.g., sense amplifiers coupled to one sense line). The sensing circuitry can also include compute components. For example, the sensing circuitry 230 can include sense amplifiers and compute components such that each of the sensing components 230 can serve as a 1-bit processing element of a processing resource.

A sense amplifier of the sensing components 230-0 can comprise a first latch and the compute component of the sensing component 230-0 can comprise a second latch. The first latch and the second latch can be used to perform logical operations including vector operations. The processing resource can be a controller and the sensing components 230 can serve as the processing resource performing vector operations on the vector registers.

In a number of examples, the processing resource 208 can receive a command to access data from a register such as a vector register. The command can be received from a processing resource local to a host and/or external to the bank 220. The command can instruct the processing resource 208 to initiate an execution of a number of logical operations. The specific logical operations to be executed can be stored in the memory array and/or can be provided by the host.

The processing resource 208 can identify a map register corresponding to a vector register. In some examples, the processing resource 208 can identify a map register utilizing an ID of the vector register. For instance, each of the map registers 206 can be associated with a different vector register ID. The processing resource 208 can store a table that maps vector register IDs to map registers 206. In some examples, the mapping between vector register IDs and map registers 206 can be stored in the array 210.

In other examples, the processing resource 208 can identify a map register based on a default setting. For example, the processing resource 208 can identify a same map register each time the command is received. The default map register can store a memory address corresponding to a plurality of memory cells that store vector data to use as an operand in a vector operation.

The processing resource 208 can retrieve a memory address from the map register, wherein the address identifies a row of memory cells from the array and wherein the row of memory cells is coupled to a plurality of sense lines and an access line (e.g., select line). For example, the processing resource 208 can retrieve a memory address corresponding to the memory cells 270-0 to 270-M. The memory address can identify a range of memory addresses by, for example, providing a base memory address and an offset. The memory address can also identify a row of memory addresses such as by identifying the Row 0 and/or an access line 228-0 to which the memory cells 270-1 to 270-M are coupled to. As used herein, the use of a row is not intended to identify physical orientation but rather an organizational orientation such that a row and/or a row of memory cells identifies memory cells coupled to a particular access line.

The processing resource 208 can then retrieve the data from the array of memory cells using the memory address. For example, the processing resource can retrieve vector data from the memory cells 270-0 to 270-M using the memory address retrieved from the map registers 206.

Mapping a given register to memory cells of the memory array 210 utilizing the map registers 206 provides the ability to utilize the memory cells as a register such as a vector register. The mapping allows multiple registers to be implemented the memory array 210. The mapping further provides the ability to create and delete registers as needed, by mapping to additional addresses or fewer addresses. Although in some examples, the quantity of registers can be fixed by the ISA.

Mapping to memory cells further provides the ability to move data without physically moving data between vector registers implemented utilizing the memory array 210. For example, if vector data is stored in a first register implemented in a first Row (e.g., Row 0) of the memory array 210 and if the result of the execution of a vector operation utilizing the vector data is stored in a second Row (e.g., Row 1) of the memory array 210, then the result of the execution of the vector operation can be moved from the first vector register to the second vector register by replacing a first memory address, corresponding to the first Row, stored in a map register with a second memory address corresponding to the second Row. That is, the result does not have to be moved from one group of memory cells to a different group of memory cells to move the result from one vector register to a different vector register. The result of the vector operation can be stored a single time in a group of memory cells and the address corresponding to the group of memory cells can be manipulated by storing it in the map registers to "move" the result.

The map registers 206 provide a mapping of the memory cells to vector registers. An example mapping is provided in FIG. 3.

Responsive to executing the vector operation, the processing resource 208 can execute further vector operations, for example, by receiving an ID of a next vector register that stores the vector data. The host can provide additional vector commands and/or can identify a location in the array 210 that stores the vector commands.

In some examples, the processing resource 208 can access vector data to perform non-vector operations. The vector data can be accessed, for example, as part of a read operation and/or a write operation.

Figure 3:
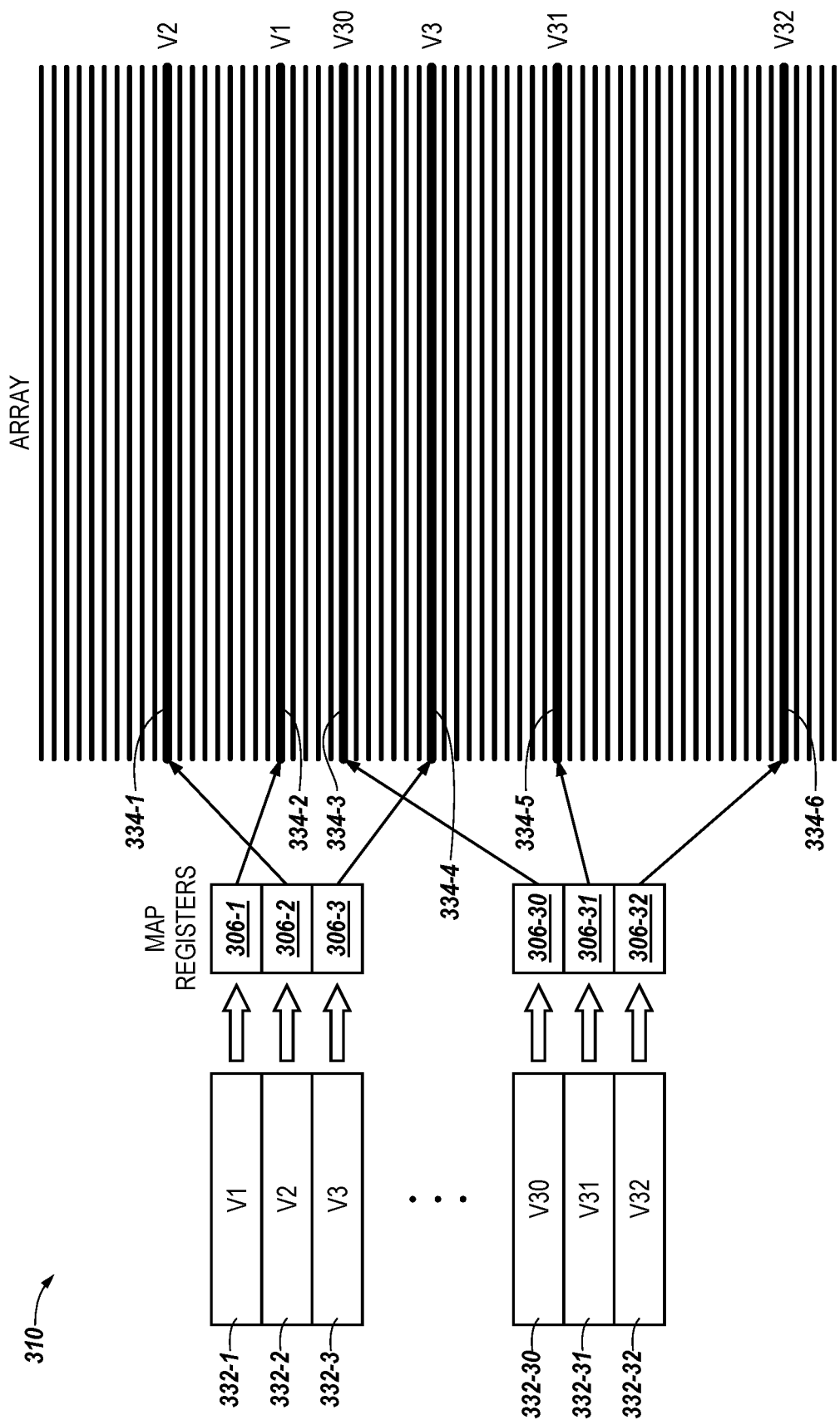
FIG. 3 is a block diagram of a mapping of map registers to vector registers in accordance with a number of embodiments of the present disclosure.

FIG. 3 is a block diagram of a mapping of map registers to vector registers in accordance with a number of embodiments of the present disclosure. FIG. 3 includes the memory array 310. FIG. 3 also includes vector register IDs 332-1, . . . , and 332-32, referred to as vector register IDs 332, and map registers 306-1, . . . , 306-32, referred to as map registers 306. The vector register IDs can be obtained, for example, from logical operations, directly from a processing resource external to a bank, and/or from the array 310. In some examples, the vector register IDs can include vector address as defined by the ISA.

In some examples, there can be a one-to-one correlation between the vector register IDs 332 and the map registers 306. For example, the vector register ID 332-1 can be mapped to the map register 306-1, the vector register ID 332-2 can be mapped to the map register 306-2, the vector register ID 332-3 can be mapped to the map register 306-3, . . . , the vector register ID 332-30 can be mapped to the map register 306-30, the vector register ID 332-31 can be mapped to the map register 306-31, and the vector register ID 332-32 can be mapped to the map register 306-32. The example provided in FIG. 3 describes thirty-two vector registers and thirty-two vector register IDs. However, the vector registers and/or the vector register IDs should not be limited to thirty-two but can include more or fewer vector registers and/or vector register IDs.

In other examples, multiple vector register IDs can be mapped to a single map register or a vector register ID may not be mapped to one of the map registers 306. The mapping of vector register IDs to map registers can provide the ability to adapt the ISA to a specific implementation of vector registers implemented in the memory array 310.

The map registers 306 can store an address corresponding to one of the rows of memory cells. For example, the map register 306-1 can store an address of the Row 334-2, the map register 306-2 can store an address of the Row 334-1, the map register 306-3 can store an address of the Row 334-4, . . . , the map register 306-30 can store an address of the Row 334-3, the map register 306-31 can store an address of the Row 334-5, and the map register 306-32 can store an address of the Row 334-6.

In some examples, a processing resource local to a bank can receive a plurality of addresses of an array of memory cells of a memory device. The memory addresses can identify memory cells that store vector data. The vector data may have been stored previously in the memory cells having the memory addresses.

The processing resource can store the plurality of addresses in a plurality of map registers of the memory device. The processing resource can then retrieve a memory address from the plurality of map registers, where the memory address corresponds to a first plurality of memory cells coupled to a plurality of sense lines and an access line which identify a Row 334-2 of the memory array 310.

The processing resource can also retrieve a vector instruction from the array 310 and/or can receive the vector instruction from a host. The processing resource can execute the vector instruction. In some examples, the vector instruction is executed using data stored in the first plurality of memory cells of the array.

In some examples, the vector instruction can be executed using data extracted from the vector instruction itself. The vector instruction can include data as part of the instruction. In other examples, the vector instructions can include references to vector registers. The vector instructions can also include references to vector registers and can include data as part of the vector instructions.

In some instances, a vector instruction can be a move operation and/or can include performing a move operation to perform the vector instruction. A move operation can move data stored in vector register 1 to a vector register 2. The vector register 1 can have a vector register identifier 332-2 and the vector register 2 can have a vector register identifier 332-1. Moving data from vector register 1 to vector register 2 can include moving/copying an address stored in map register 306-1 to map register 306-2.

This example illustrates the savings gained by implementing the vector register in rows 334 of the memory array 310. If the vector registers were implemented without utilizing the memory array, 310 moving data from one register to a different register would include moving a vector of data, which could, for example, include moving 16,384 bits of data. However, implementing the vector registers utilizing rows of the memory array 310, a move operation can include moving an address from a map register to a different map register. Moving an address between map registers may include moving 16 bits, given that a memory address may expressed in 16 bits.

In some examples, a processing resource local to a bank can receive a vector data. The processing resource can store the vector data in the memory array 310 and can store the corresponding addresses in the map registers 306 to build a mapping between the map registers 306 and the rows 334 of memory arrays.

Though specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
an array of memory cells, wherein a plurality of rows in the array serve as a plurality of vector registers as defined by an instruction set architecture; and
a processing resource configured to:
receive a vector register identification (ID) of a particular vector register, wherein the vector register ID is received from a host processing resource;
retrieve, from a table stored in the array of memory cells, a map register ID using the vector register ID;
retrieve a memory address of a row of memory cells from a map register having the map register ID, wherein the memory address corresponds to memory cells commonly coupled to a particular row of the array; and
receive vector instructions from the host processing resource, wherein the vector instructions are received to perform a particular vector operation corresponding to the vector instructions on the particular vector register and wherein the vector instructions are executable by the processing resource and by the host processing resource as defined by the instruction set architecture;
extract additional data from the vector instructions;
responsive to receiving the vector instructions, access data from the particular row of the array to perform the particular vector operation;
responsive to accessing the particular row of the array, perform the particular vector operation on the data accessed from the particular row of the array and the additional data, extracted from the vector instructions, used as operands, wherein performing the particular vector operation includes replacing a memory address, corresponding to the particular row, stored in the map register with a different memory address corresponding to a different row of memory cells of the array where results of the particular vector operation are stored.

2. The apparatus of claim 1, wherein each row of the plurality of rows comprises a group of memory cells commonly coupled to one of a respective plurality of access lines of the array.

3. The apparatus of claim 1, wherein the processing resource is a controller and is further configured to execute a plurality of operations utilizing the data accessed from the particular row.

4. The apparatus of claim 3, wherein the processing resource is further configured to, without transferring the data, accessed from the particular row, to a host to which the processing resource is coupled:
execute the plurality of operations; and
cause storing of a result of the execution of the plurality of operations in the plurality of rows.

5. The apparatus of claim 1, wherein the processing resource is further configured to map the particular vector register to the particular row utilizing the map register, wherein the map register stores an address of the particular row.

6. The apparatus of claim 1, wherein the processing resource is further configured to access the particular row utilizing the vector register ID corresponding to the particular vector register.

7. The apparatus of claim 6, wherein the vector register ID is defined by the instruction set architecture.

8. A method, comprising:
receiving, at a memory device, a plurality of memory addresses of an array of memory cells, wherein the plurality of memory addresses correspond to respective rows of memory cells from the array of memory cells;
storing the plurality of memory addresses in a plurality of map registers of the memory device;
receiving vector instructions from a host processing resource to perform a vector operation corresponding to the vector instructions;
extracting additional data from the vector instructions;
receiving, at the memory device, a vector identification (ID) corresponding to a vector register as defined by an instruction set architecture, wherein the vector ID is received from the host processing resource and wherein the host processing resource is external to the memory device; and
retrieving, from a table stored in the array of memory cells, a map register ID utilizing the vector ID;
retrieving, via the first processing resource, a memory address from a map register having the map register ID, wherein the memory address corresponds to a first row of the array;
accessing, via a second processing resource of the memory device, vector data from the first row using the memory address; and
executing the vector operation on the vector data and the additional data wherein the data and the additional data are used as operands, wherein the vector operation is executed by the second processing resource of the memory device and wherein the second processing resource comprises compute components of sensing circuitry of the memory device, and wherein performing the vector operation includes replacing the memory address, corresponding to the first row, stored in the map register with a different memory address corresponding to a different row of memory cells of the array where results of the vector operation are stored.

9. The method of claim 8, wherein the map register stores a memory address corresponding to the first row comprising the first group of memory cells, which are commonly coupled to an access line of the array.

10. The method of claim 9, further comprising receiving, at the first processing resource, a request to update the vector register, wherein the request includes a new memory address of the array.

11. The method of claim 10, wherein the new memory address identifies a different row designated as the vector register.

12. The method of claim 11, further comprising storing the new memory address in the map register to map the vector register to the different row.

13. The method of claim 12, wherein the vector register is updated without moving data stored in the first row to the different row.

14. The method of claim 8, wherein the plurality of memory addresses is received from the host processing resource.

15. The method of claim 8, wherein the vector operation is executed using the vector data stored in the first group of memory cells and vector data stored in a second group of memory cells of the array, wherein the second group of memory cells are a different vector register.

16. A system, comprising:
   a host configured to generate vector register identifications (IDs) and vector instructions; and
   a memory device coupled to the host and comprising:
   a plurality of map registers to map vector register IDs to rows of an array of memory cells of the memory device; and
   a processing resource configured to:
      receive a vector register ID from the host;
      receive vector instructions from the host to perform a vector operation, corresponding to the vector instructions, on a particular vector register;
      extract additional data from the vector instructions;
      cause the vector operation received from the host to be executed using the additional data and data stored in a row of the array as operands by:
         accessing, from a table stored in the array of memory cells, a map register ID utilizing the vector register ID;
         accessing a memory address of a row of memory cells from the map register, using the map register ID, to determine to which row in the array the particular vector register currently maps; and
         accessing the row in the array to which the particular vector register currently maps;
      wherein the processing resource is further configured to perform a non-vector operation using the additional data and the data stored in the row of the array as operands by replacing the memory address, corresponding to the row, stored in the map register with a different memory address corresponding to a different row of memory cells of the array where results of the particular vector operation are stored.

17. The system of claim 16, wherein the host is further configured to provide the vector register ID and the vector instructions via a bus coupling the host to the memory device.

18. The system of claim 16, wherein host comprises an application processor.

19. The system of claim 18, wherein the host is on a same die as the memory device.

20. The system of claim 16, wherein a corresponding one of the plurality of map registers stores a quantity of bits which are fewer than bits stored in the particular vector register.

* * * * *